Figure 1:
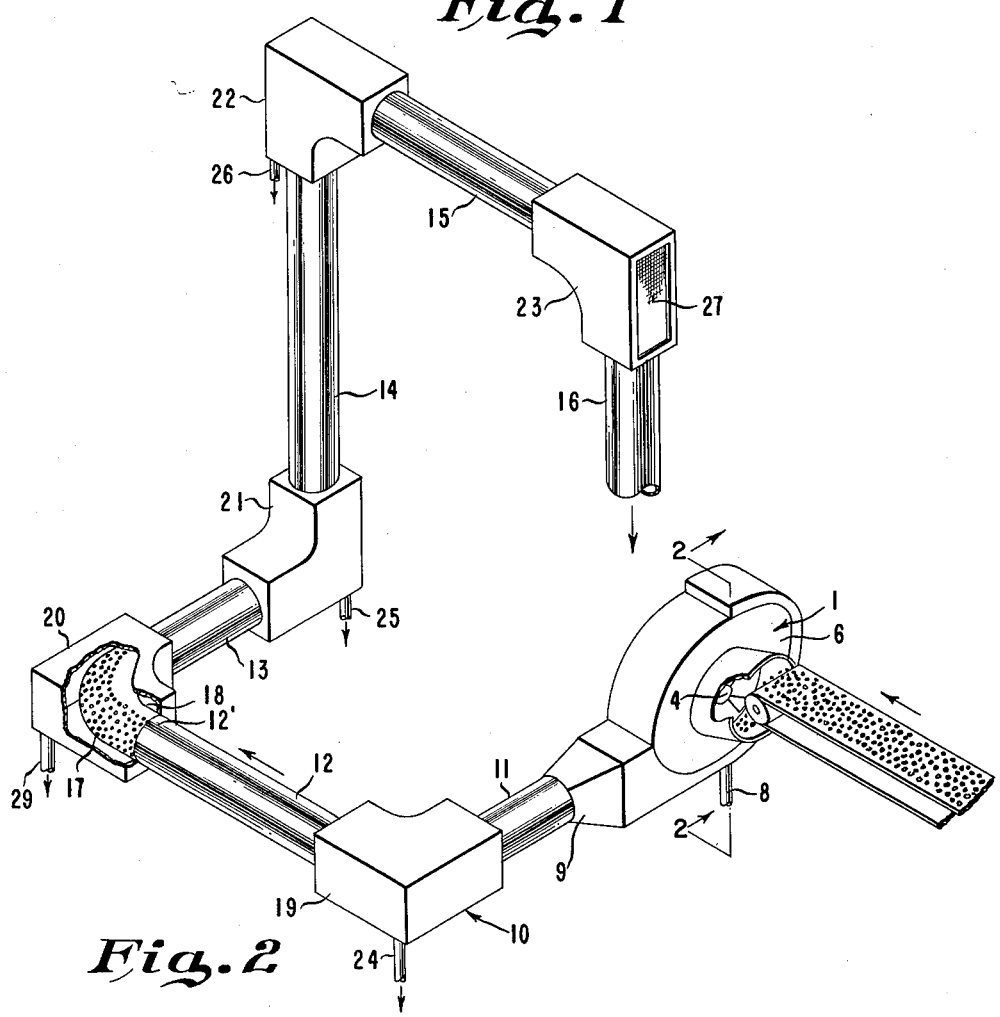
Figure 2:
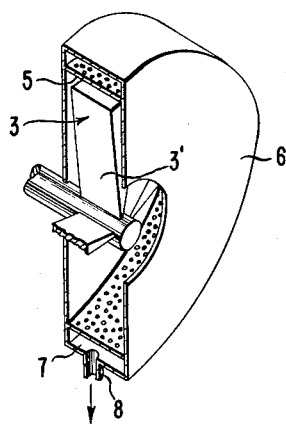

July 24, 1962  J. G. S. BILLINGSLEY  3,045,359
CENTRIFUGAL DRYING
Filed Feb. 19, 1959

INVENTOR
JOHN G. S. BILLINGSLEY

BY H. William Petry

ATTORNEY

United States Patent Office 3,045,359
Patented July 24, 1962

3,045,359
CENTRIFUGAL DRYING
John George Selby Billingsley, Newark, Del., assignor to E. I. du Pont de Nemours and Company, Wilmington, Del., a corporation of Delaware
Filed Feb. 19, 1959, Ser. No. 794,329
3 Claims. (Cl. 34—8)

This invention relates to the drying of particulate solids and especially to an improved process and apparatus for drying synthetic polymeric pellets or flakes.

In the production of polymer to be used in the spinning of fibers or for molding into various articles of commerce, it is customary to extrude molten polymer from a reaction vessel, quench the extruded material with water and then cut it into pellets or flakes. The wet pellets or flakes must then be dried to a relatively low moisture level to be suitable for use in fiber spinning or molding operations. Drying of the resulting pellets by conventional means, such as subjecting them to a stream of hot air, is expensive because of the large amount of water which must be removed. A rapid and economical method of drying wet pellets of this type is, therefore, most desirable.

It is an object of this invention to provide a process and apparatus for rapidly and economically drying particulate solids. Another object is to provide an improved process and apparatus for removing substantial quantities of water from polymer pellets. Other objects will become apparent from the description and examples to follow.

The above objects are accomplished according to this invention by a process comprising imparting a centrifugal action to wet particulate solid material, preferably while simultaneously directing said material against a perforated structure, directing the particulate material in a substantially rectilinear path away from the perforated structure against another perforated structure and changing the direction of the particulate material by about 60° to about 120° in the vicinity of the latter structure. Preferably, this latter procedure of directing the particulate material against a perforated structure and changing the direction of its path is repeated until the particulate material is substantially dry. Liquid is removed from the material, preferably pellets of a synthetic, linear polymeric composition, at each of the sharp bends in its path as it is impinged against the perforated structures. Removal of liquid from the pellets is particularly facilitated if they are treated while at a temperature of at least about 105° C.

The apparatus of this invention comprises a centrifugal fan of the type which is conventionally used for handling solid materials, the fan being equipped with a perforated scroll located around the inner periphery, forming a peripheral passageway to permit removal of liquid from the solid material by centrifugal action of the fan, means to remove liquid from the peripheral passageway between the fan and the scroll, and a duct system composed of a series of substantially straight sections of conduit joined by elbows which provide relatively sharp bends in the duct. These bends are preferably substantially right angle turns for optimum removal of moisture from the particles, but may vary from about 60° to about 120°. The outer walls of the elbows are uniformly perforated to permit egress of liquid from the material being dewatered. The perforation should be of such size as to permit passage of the liquid without difficulty but should not be so large as to result in loss of particles being conveyed or plugging of holes by particles at these points. The exact size of the perforations may vary depending upon the size of the particles being conveyed; in general, however, perforations in the range of 1/16 inch to 1/8 inch in diameter are suitable for processing most synthetic polymeric pellets. Preferably, the last elbow in the system is fitted with a screen to permit a large amount of moisture laden air to exhaust at this point. The elbows are provided with a suitable means for draining away the liquid passing through the perforations. Excessive loss of conveying air through perforations can be prevented by limiting the size of the drain. A small flow of air through the perforations to the drain is desirable to aid in removing water from the elbows. The ducts are preferably substantially circular in transverse cross sections but other shapes may be used if desired. The diameter of the duct will depend on the amount of materials to be handled. The length of the sections between the elbows will vary depending upon space limitations and on the location of the vessel to receive the material; sections varying in length from a few inches to 10 ft. or more in length are satisfactory.

FIGURE I illustrates a suitable fan and duct system with which the process of this invention may be practiced and a cutaway view of one of the elbows of this invention.

FIGURE II illustrates a cutaway view of the centrifugal blower along line 2—2 of FIGURE I.

One embodiment of the apparatus of this invention is shown in the drawings. Centrifugal blower 1 is equipped with an inlet tube 2 and rotatable fan 3 mounted on shaft 4 driven by a suitable motor (not shown), said fan having blades 3' of uniform length attached thereto. A perforated plate 5 is fitted along the inner peripheral surface of cover plate 6 of the centrifugal blower, defining an inner peripheral passageway 7. Cover plate 6 is fitted with an outlet tube 8 to permit passage of fluid. The perforated plate is interrupted sufficiently to provide an outlet 9 from the centrifugal blower 1 into the duct system 10 composed of a series of substantially straight sections of conduits 11, 12, 13, 14, 15, and 16 connected in series by elbows such as shown at 12' in FIGURE II. The screw connections are not shown. The walls 17 and 18 of the elbows define an accurate path of about 90° between connected sections of conduit. Outer wall 17 of elbow 12', the wall against which the pellets are directed, is perforated to permit passage of liquid from the pellets into cover chamber 20, which is fitted with outlet tube 29. Cover chambers 19, 21 and 22 are similarly arranged and are fitted with outlet tubes 24, 25, and 26.

The last elbow 23 in the duct system is fitted with a screen 27 to permit maximum air exhaust. Conduit section 16 leads from cover chamber 23 into any suitable blender (not shown) for blending and storage.

Operation of the process is easily understood. Wet particulate solid materials, such as wet polymer pellets, are fed into the centrifugal fan by any suitable means, such as by a conveyor belt. Some of the water is thrown off of the pellets by the centrifugal action of the fan and this water drains away through the peripheral passageway. The material is blown into and through the duct system by the blower. At each of the elbows an appreciable amount of water is thrown off of the material and passes through the apertures in the outer wall of the elbow. After passing several elbows, the number required depending on the amount of water present and the ease with which it is removed, the surface water is substantially removed.

If the material is hot when introduced into the drier, then the residual heat will usually be sufficient to evaporate any small amount of remaining moisture. If the material is not hot when introduced into the system, additional drying may be employed if desired to reduce the moisture content to any desired level. For this purpose, the material may be dried after removal from the duct system in any suitable manner. On discharge from the duct system the material may be collected in suitable containers for storage or discharged onto a conveyor belt or other handling means.

*Example*

Polyhexamethylene adipamide, prepared as described in U.S. 2,163,636, is extruded at a rate of 150 lbs./min. from an autoclave downwardly through an extrusion die onto a moving conveyor belt. The extrusion die has 31 holes, each $9/_{64}$ x $27/_{64}$ inch in cross section, arranged in a single line with ¼ inch spacing along the long dimension. The flow rate is controlled by a valve located immediately above the extrusion die. The valve and die assembly are electrically heated in an insulated enclosure to maintain a polymer temperature of 270°–275° C. A water spray situated immediately ahead of the extrusion position forms a film of water on the moving conveyor belt and extruded polymer strands. Additional water sprays are located at 1-foot intervals down the 15-foot length of the conveyor belt to adequately cool the exterior portion of the strands prior to cutting. The sprays are operated at an average rate of flow of about 5 gallons per minute from each spray, the temperature of the water being approximately 15° C.

The rubber impregnated canvas conveyor belt has slightly raised edges to prevent drain-off of water over the edges of the belt. At a point about 6 feet from the discharge end of the conveyor, lined shields are placed in a manner to converge the group of strands from the original 23-inch spread across the width of the conveyor to approximately a 13-inch spread so that they may be readily fed into a conventional Taylor-Stiles rotary type 14-inch cutter. The strands are then passed between two feed rolls of 2½ inch diameter, the drives of the feed rolls being integrated with the drive of the cutter rotor assembly so that a uniform $3/_{16}$ inch length of strand is fed to the bed knife between each fly knife on the roller assembly. The peripheral speed of the feed rolls is slightly (about 5%) higher than the lineal speed of the conveyor belt (about 375 feet per minute) in order to provide a positive pulling of the strands from the belt.

The cut pellets drop downwardly into the lower end of a woven-wire belt conveyor and are immediately sprayed with water to prevent thermal degradation. Two sprays having a flow rate of about 3 gallons per minute each are employed for this purpose. In addition, a great portion of water from the strand conveyor flows through the cutter and aids in quenching the cut particles. The conveyor belt is constructed of stainless woven wire to permit drainage of the water. The pellets, of a size about $1/_{16}$ to $3/_{32}$ inch thick, from about $3/_{16}$ to $5/_{16}$ inch in width and about $5/_{32}$ inch in length, are dropped from the conveyor into a materials handling fan of the type described above, having an air capacity of 2800 cubic feet per minute. The temperature of the pellets on introduction into the fan is about 120° C. Part of the water is removed from the pellets by the centrifugal action of the fan and drains away through the perforated inner scroll of the fan. The pellets are blown by the fan into a duct system composed of sections of straight conduit 7½ inches diameter and about 10 ft. in total length connnected by five 90° elbows, the linear velocity of the air being 9100 ft./min. The outer wall of the first four elbows is constructed of perforated plate having perforations of $3/_{32}$ inch diameter on ⅜ inch 60° staggered centers. The last elbow is fitted with an 8 mesh wire screen to permit maximum exhaust of moisture laden air at this point. The pellets are discharged from the duct system into a blender for blending and storage. The temperature of the pellets on discharge is about 90° C. and the moisture content is 0.4 to 0.6%. After the pellets have come to room temperature being cooled by room air, the moisture content is about 0.3%. The pellets are melted and extruded into filaments to form high quality yarn with no difficulty.

The process and apparatus of this invention provide a simple and economical means of drying solid particulate materials. They are particularly suited to the rapid and inexpensive removal of water from wet polymeric pellets or flakes and are especially attractive when the particulate material is introduced into the drying system while still hot. Under these conditions, there is seldom any need for applying supplemental heat.

In addition to its usefulness in the drying of hot pellets or flakes or other granular material, the present process and apparatus may be used advantageously in any case where it is desired to remove substantial quantites of water from particulate material. Supplemental drying may then be employed to further reduce the moisture content if desired, though for normal uses this is unnecessary.

In processing hot particulate materials, the temperature required at the point of introduction into the apparatus will, of course, depend upon the final moisture content desired and the ease with which the moisture is removed. However, in the case of polymers which have a moisture regain of less than about 5% at 70° C. and 65% room humidity, it is desirable that the temperature of the wet flake be at least about 105–110° C. in order that the final moisture content be reduced to a point where the polymer is suitable for extrusion or molding.

The duct system is preferably constructed of stainless steel but may be made from other materials such as galvanized iron or a plastic, etc., if conditions permit.

The velocity of air required in carrying out the instant process will vary depending upon the nature and size of particles being conveyed in the system and upon the rate of flow of material desired for a particular size duct system. Generally speaking, for efficient removal of water the velocity should be substantially above the minimum flow required to convey the particles through the system. The optimum velocity may, of course, be readily determined by one skilled in the art. While a small number of perforations will obviously be of some value in removing water from the material, it is preferable to use the maximum number of perforations possible. The number will, of course, be limited by the size of the perforations and by considerations of strength since the perforated wall must be sufficiently strong to withstand the impact of the particulate material. As mentioned previously, the size of the perforations should not be so great as to cause loss of material or plugging of the holes, however, it is desirable that the openings should be as large as is possible without encountering these difficulties.

I claim:

1. In a process for continuously separating liquid from a wet particulate material of organic polymeric composition, comprising the steps of accelerating the material in a moving pressurized fluid stream in a closed conduit in a substantially rectilinear path, abruptly changing the direction of said moving material in a given zone to separate at least some of the liquid therefrom, the improvement comprising collecting and draining said separated liquid away from said zone while preventing loss of the pressurized fluid so that the pressure of the moving fluid is maintained substantially unchanged throughout the conduit.

2. An improved drying apparatus for separating water from solid particulate polymeric material, said apparatus comprising a centrifugal blower means, said blower means comprising a housing having an inlet and an outlet and a driven rotary impelling element for engaging and forwarding at high speeds wet particulate material and a fluid medium supplied through said inlet, a first substantially straight closed conduit connected to said outlet and extending in a first direction, a second substantially straight closed conduit means oriented and extending in a direction making an angle of from about 60° to about 120° with the direction of said first conduit, a curved elbow conduit section fitted to and joining said first and second conduits to smoothly rapidly change the direction of movement of material passing therethrough at high speed, the outer curved portion of said elbow section provided with a uniformly distributed plurality of perforations, said perforations of such a size with respect to the wet particulate material that passage of the material through said perforations is prevented, while permitting separation of the moisture from the moving wet particulate material, a closed chamber enclosing said perforated elbow section and engaging the exterior of said conduit in sealing relationship to collect moisture separated from said moving material through said perforations, a drain conduit of restricted cross section leading from said chamber to drain said chamber of collected moisture while preventing loss of the fluid medium.

3. An improved apparatus for forwarding a mixture of wet solid particulate polymeric material and a fluid medium and simultaneously separating at least a portion of the moisture from said wet material, said apparatus comprising a centrifugal blower means, said blower means comprising a housing provided with an inlet, an outlet, and a driven rotary impelling element for engaging and forwarding wet particulate material and a fluid medium supplied through said inlet, said housing comprising an inner curved wall portion surrounding said rotary element and closely fitted to the path of movement of said element, said inner curved wall portion provided with a distributed plurality of perforations therethrough, said perforations of a smaller size than the material particles, said housing and said inner curved portion constructed and arranged to form a peripheral annular chamber surrounding said rotary element for collecting moisture separated through the perforations from the wet material passing through the said rotary impelling element, a drain conduit of restricted cross section leading from said annular chamber to drain off collected moisture without substantial loss of the fluid medium.

References Cited in the file of this patent
UNITED STATES PATENTS

| | | |
|---|---|---|
| 1,880,273 | Pardee et al. | Oct. 4, 1932 |
| 2,511,970 | Cox | June 20, 1950 |
| 2,828,549 | Guggenheim | Apr. 1, 1958 |